United States Patent Office 3,507,390
Patented Apr. 21, 1970

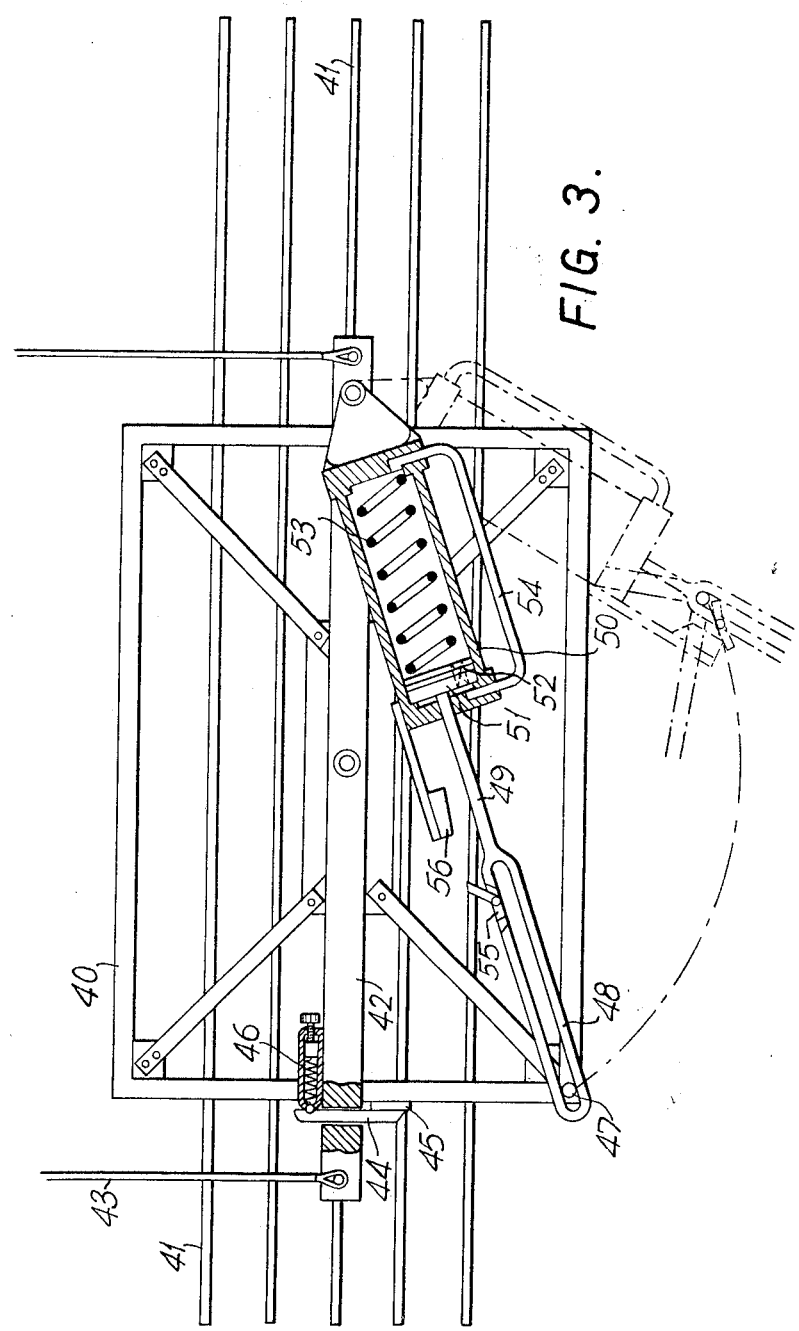

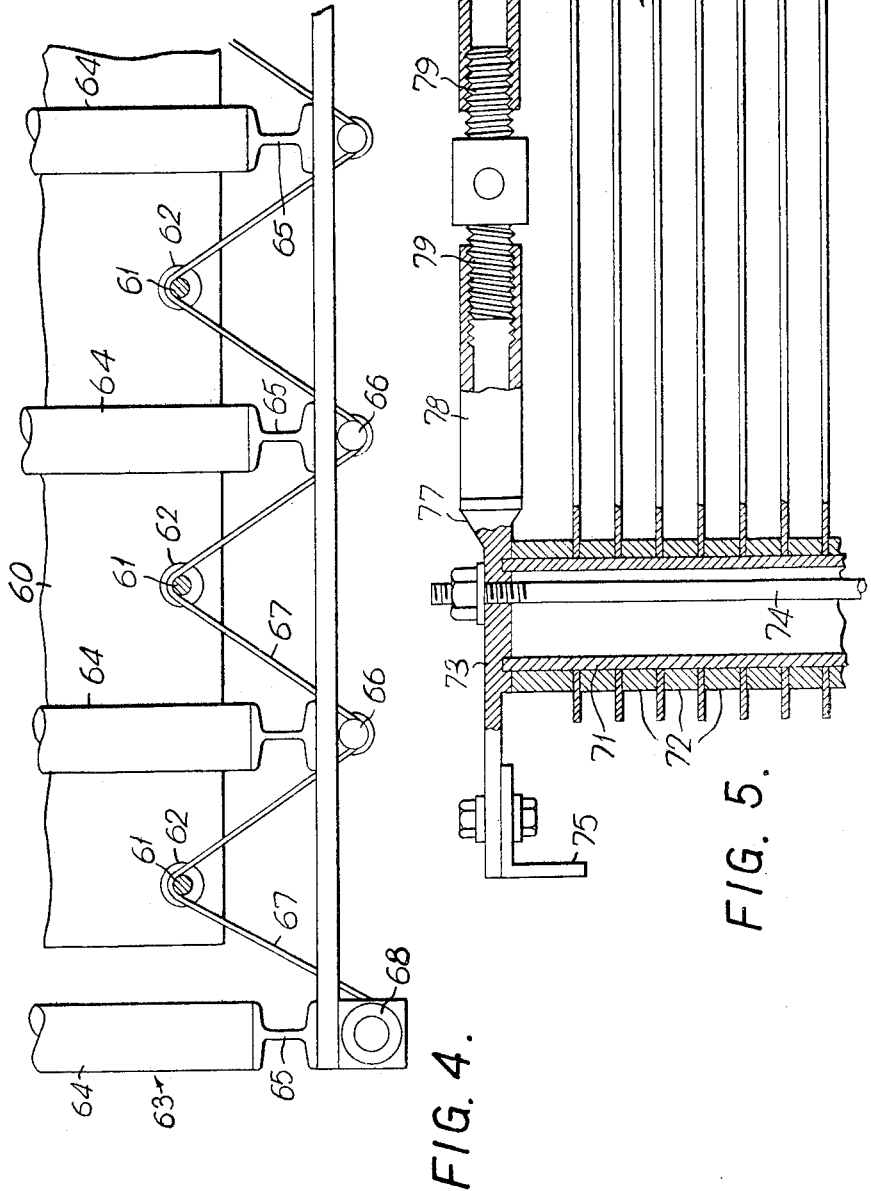

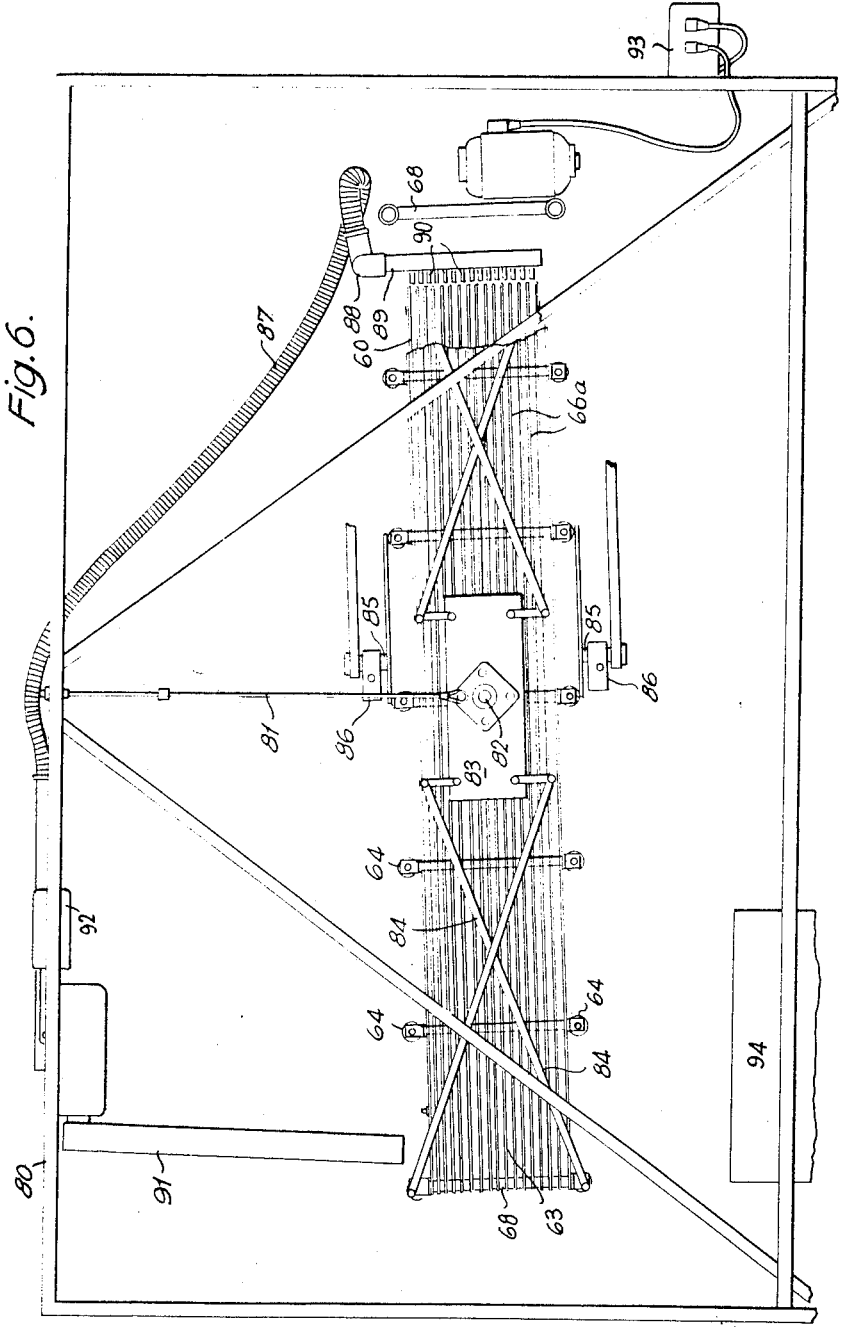

3,507,390
TREATMENT OF SUSPENSIONS
Richard Henry Mozley, Cornwall, England, assignor to National Research Development Corporation, London, England, a corporation of Great Britain
Filed Oct. 24, 1967, Ser. No. 677,676
Claims priority, application Great Britain, Oct. 26, 1966, 48,143/66
Int. Cl. B03b 3/12
U.S. Cl. 209—437                                 11 Claims

ABSTRACT OF THE DISCLOSURE

Apparatus for performing separations of ores and like materials based on differences of density or particle size comprises one or more surfaces on which a suspension of the material is caused to flow at low velocity, separation being achieved as a result of an orbital motion applied to the surface which causes the lighter or finer particles to advance down the surface in an upper layer while the heavier or coarser particles are retarded in a lower layer and form banks of accumulated material on the surface. The apparatus preferably has the form of a multi-sheet stack of surfaces held in lateral tension and suspended in a frame to which the orbital movement is applied by means of one or more out-of-balance shafts.

---

Figures 1, 2:
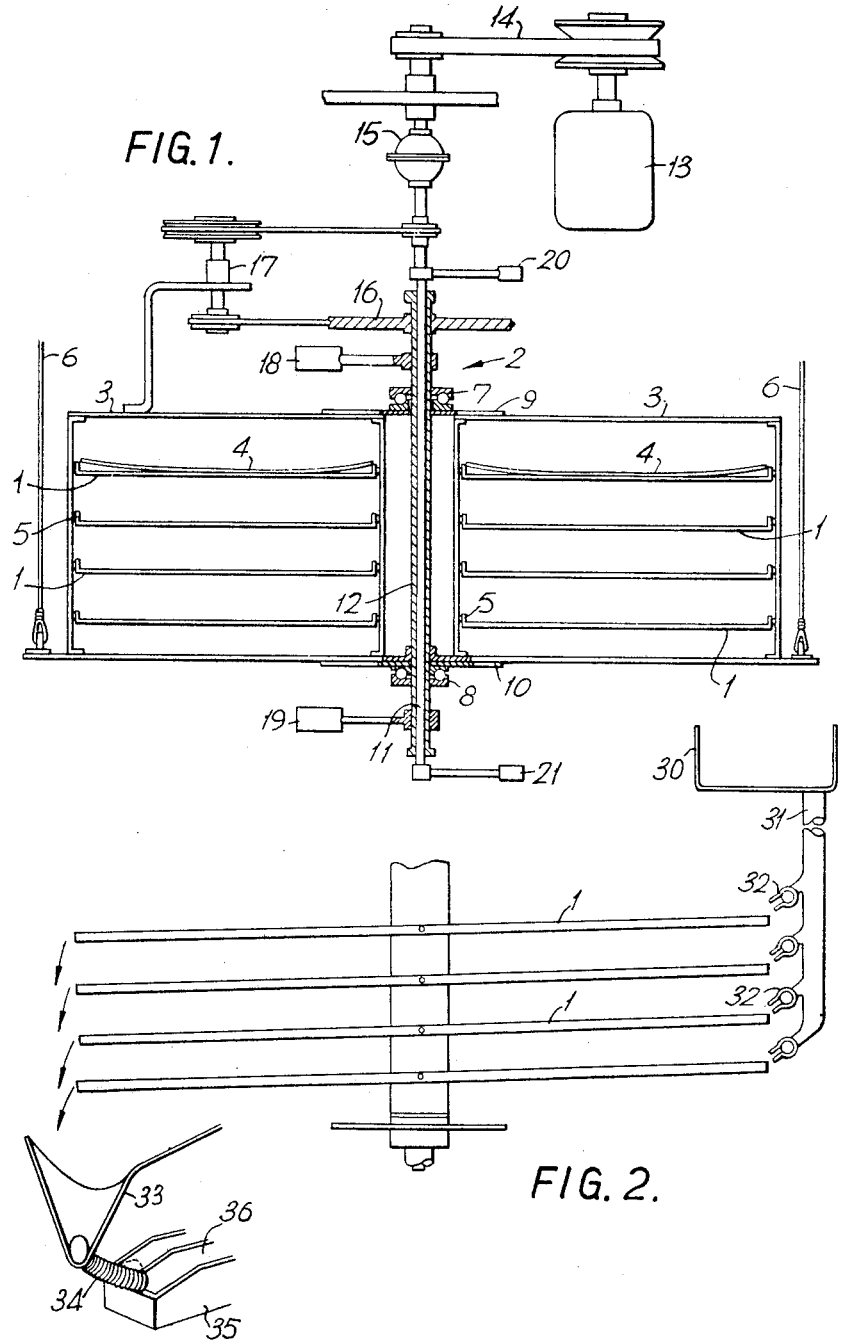

This invention relates to the treatment of suspensions of solid materials in a liquid medium, and more particularly to the separation of suspensions containing material distributed over a range of particle size and/or density.

The invention is of primary application to mineral dressing practice and to the recovery of valuable materials from crude ores by gravity separation, a technique on which is based most of the traditional mineral dressing equipment employed for the treatment of tin ores. The invention has arisen in the course of attempts to develop equipment which will handle tin-bearing slimes and recover from them a proportion of their residual tin content which, due to the low separating efficiency of conventional equipment, is at present sacrificed. The invention will, therefore, be described for convenience in connection with the classification of tin-bearing slimes, but it will be understood that it is applicable also to the treatment of coarser fractions encountered in the earlier stages of the same process, and to the handling of suspensions of other ores and like materials especially ores which are difficult to treat by flotation methods. It may also be used for sizing fine clays and various materials e.g. china clay.

The round frame and the vanner have for many years formed the basis of the traditional equipment of slime plants in the tin mining industry. In the round frame the slime is fed to the upper end of a slowly rotating frusto-conical surface, and during its downward flow on the surface a measure of gravity separation occurs. The heavier fraction thus accumulates on the surface and is removed by means of a radially oscillating brush sited at a position remote from the feed point. The vanner employs an endless moving belt, the upper surface of which moves upwardly at a gentle slope carrying slime fed to its lower end, and is oscillated transversely to increase the degree of separation. Wash water flows downwardly on the belt surface to carry the finer particles in the opposite direction to the heavier tin-bearing fraction which adheres to the belt and is removed at its upper turnround. Of these two forms of equipment, the round frame is now regarded as obsolescent, and although vanners are still installed their limitations are widely appreciated. Vanners are mechanically very complex, having a multitude of moving parts and are expensive both to install and to operate, and their efficiency leaves much to be desired.

A further device employed in the earlier stages of the process is the Denver Buckman tilting frame which has a number of relatively steeply inclined trays on which the suspension flows rapidly downwardly. The trays are stationary during the period of flow, but at intervals flow is interrupted and the trays are tilted in the opposite direction whereupon the accumulated heavier fractions are washed off by means of powerful jets of water. This machine is far from satisfactory, however, and only gives a crude separation as no attempt is made to control flow conditions in the moving stream.

In the course of experiments on the flow of a slime layer moving under controlled conditions on a gently sloping surface oscillated laterally, it was discovered that an effect could be obtained at the lower edge of the surface which resulted in the splitting of the stream into lighter and heavier fractions. It has been found in these experiments that if the oscillation frequency is gradually reduced, a condition is reached in which the heavier fraction instead of flowing over the lower edge accumulates on the surface, layer upon layer, an effect which may be described as "banking," whilst the lighter fractions retained in suspension are not so retarded and flow onwardly down the surface and over the edge. By careful control of the parameters of the system a degree of separation can be achieved which is very great and considerably in excess of the separating performance of the apparatus previously used.

According to this invention a gravity separation device for the treatment of ores or other solid materials containing fractions of different density and/or particle size comprises a surface on which a liquid suspension of the material is fed, and means for applying to the surface on orbital motion in the plane of the surface to cause the suspension to flow on the surface at a slow speed towards an edge thereof, the amplitude and frequency of the motion being such that the lighter fractions or finer particles remain suspended in the upper portion of the layer of material, and are gradually advanced to the edge of surface whilst banking of the heavier fractions or coarser particles occurs on the surface. To facilitate the separation the surface is disposed with a gentle slope, e.g., 1–3° or lower, the exact magnitude of which depends on the material being processed.

The amplitude and frequency of the orbital motion appropriate to achieve the desired effect may be determined by experiment for the particular system under investigation. As a guide, however, for the treatment of slimes, it is recommended that the extent of the shake be such that the consequent shearing action on the moving layer, which is zero or very low on the shaken surface, rises to a maximum at a point within the thickness of the layer and falls away to a very low value at the upper surface of the layer, so that the uppermost region of the slime layer is advanced slowly under relatively tranquil conditions. For coarser materials a more rapid attenuation of shear may be tolerated. For slime layers, a thickness of the order of 1 mm. is very convenient.

In order to separate even thicker layers of moving slime than is possible by operating with a single orbital motion, as specified above, an additional orbital shake may be superimposed which is more intense than the original motion, i.e. having a much greater frequency. This additional shake will have a correspondingly reduced amplitude. The invention, therefore, also includes apparatus having means for applying to each of the surfaces in the plane thereof a primary orbital motion of relatively higher amplitude and low frequency, and a secondary orbital motion of relatively lower amplitude and higher frequency.

In practice the desired orbital motion may be applied to the surface by means of an out-of-balance shaft carried by a frame supporting one or more trays which provide the sloping surface. In a preferred embodiment of the invention the apparatus comprises a plurality of trays arranged one above the other at a low inclination to the horizontal and carried by a movable frame suspended or otherwise supported from a fixed support frame, and an out-of-balance shaft mounted for rotation on the movable frame whereby an orbital shaking motion may be imparted to the movable frame, and means for varying the speed and degree of imbalance of said shaft whereby the amplitude and frequency of the orbital motion may be adjusted. One convenient arrangement comprises two short shafts mounted one on top of, the other on the bottom of the frame and arranged to rotate in synchronism in an out-of-balance manner.

The invention further comprises a process for treating ores or other solid materials containing fractions of different density and/or particle size in which a liquid suspension of the material is fed to a surface which is subjected to an orbital motion in the plane of the surface to cause the suspension to flow towards an edge thereof at slow speed, the amplitude and frequency of the motion being such that the lighter fractions or finer particles remain suspended in the moving layer and are gradually advanced along the surface whilst the heavier fractions or coarser particles are retained on the surface, and accumulate layer upon layer.

In operating the apparatus of this invention the process is carried out for a sufficient period of time until the banked layer of the heavier or coarser fraction has built up to a substantial degree, and flow of the raw material is then interrupted to permit recovery of the accumulated material from the inclined surfaces. The material may be recovered by washing it off with water or other suitable wash liquid, preferably under sufficient pressure to dislodge the firm layer of product. Recovery may be facilitated by tilting the surfaces for example, by tilting the frame on which the trays are supported. The desired product is thus washed down the trays and is collected in a suitably positioned collecting device. Flow of the raw material is then recommenced, after returning the trays to their original position if tilting has been employed, and the cycle of events is continued. The whole sequence of events is readily amenable to automation. For example, the frame carrying the trays may be pivotally mounted on a beam or other structure and arranged to tilt at a predetermined stage in the process, means being provided to retain the trays in the tilted position, fully upright if desired, during the washing operation, and to return the frame to the original working position at the end of the washing stage. It is found in practice that the banks of heavier material tend to form lower down the trays rather than in a uniform distribution, and by suitably designing the apparatus and locating its centre of gravity the weight of banked material may be used to provide the turning movement to tilt the frame, or at least to provide an initiating movement or signal in connection with the tilting operation.

In the construction of larger machines in accordance with this invention, it is especially desirable to maximise the number of trays for a given space, and the trays must therefore be disposed one above the other at the closest convenient spacing. Where the trays are formed from thin flexible material, e.g. sheets of plastic, it is found that the sagging of the material makes it difficult to achieve as close spacing as desired, and according to a further feature of this invention, in apparatus comprising a stack of surfaces of thin and flexible material, lateral and if necessary longitudinal tension is applied to each surface in order to straighten it and permit of close spacing of the surfaces one from the next.

Tension may be applied to the surfaces in a variety of ways. One very convenient method is to mount a stack of spaced sheets on rods or tubes running through the stack and disposed at intervals along the opposite sides thereof, tension then being applied by means of tensioning wires threaded alternately around the rods or tubes of the stack and around similar rods or other members forming part of a tensioning frame. Alternatively the sheets may be tensionsed by being thrust outwardly e.g. by means of struts bearing against the rods or stiffened tubes passing through the stack and expanded outwardly in both directions by jacks, turnbuckles or equivalent devices operated from a central point.

The invention is illustrated in the accompanying drawings in which:

FIGURE 1 is a vertical section of the apparatus.
FIGURE 2 is a partial side view.
FIGURE 3 is a partial side view of a modification of FIGURE 1.
FIGURES 4 and 5 represent alternatively designed apparatus embodying tensioning devices.
FIGURE 6 is a side view of apparatus incorporating the device of FIGURE 4.

The apparatus of FIGURE 1 comprises eight trays 1 mounted in two banks of four on opposite sides of a shake shaft system 2. The trays 1 in each bank are carried on a rectangular sub-frame 3 and are mounted one above the other at a gentle slope, e.g. 1° to the horizontal. A convenient size of the tray is 8' x 4', and a suitable spacing between any one tray and the one above it is 9". The main surface 4 of the trays 1 is gently curved upwardly at its outer ends, as shown, in order to avoid the formation of standing waves in the slime across the trays. The surface 4 of the tray is conveniently in the form of a sheet of plastics material supported between side pieces 5.

The sub-frame 3 is suspended by means of four suspension wires 6 from a fixed frame (not shown).

The shake shaft system 2 is carried in bearings 7 and 8 fixed to the upper and lower members 9 and 10 of the sub-frame 3. The system 2 comprises two concentric vertical shafts 11 and 12. The inner shaft 11 is driven by means of an electric motor 13 mounted on the sub-frame 3 through a variable speed drive 14, and a flexible coupling 15. The outer shaft 12 is driven from the inner shaft 11 through a speed reduction gear comprising a V belt pulley 16 and a lay shaft 17 mounted on the sub-frame 3. Eccentrically mounted on the outer shaft 12 are heavy weights 18 and 19, and smaller weights 20 and 21 are similarly mounted on the inner shaft 11. The outer shaft 12 which is therefore run in an out-of-balance manner provides the main component of low speed and large amplitude of the orbital shaking movement imparted to the sub-frame 3. The faster running inner shaft 11 provides an additional shake component which is of smaller amplitude.

Referring now to FIGURE 2, the apparatus is provided with a reservoir 30 for the slime to be treated, having a downwardly extending pipe 31 which supplies a series of manifolds 32 extending across the upper end of the trays 1. At the lower end of the trays 1 is shown a transverse trough-shaped collector 33 fitted with a flexible outlet pipe 34 by means of which the discarded lighter fractions are fed into a vessel 35 on one side of a central partition 36, the desired product being fed through pipe 34 into the other part of the vessel 35 at the appropriate stage in the process.

The sub-frame 3 has attached to it additional suspension wires (not shown) which can be wound up at their upper end to cause tilting of the sub-frame to a much steeper angle, e.g. 30°.

In operating the apparatus with tin-bearing slimes, very satisfactory results have been obtained with the outer shaft 12 running at 100–200 r.p.m., and the weights 18 and 19 being of the order of 4 kg. mounted at a radius of about 8". With these values an orbital motion of about ⅜" amplitude is obtained. The feed rate of a normal slime is typically about 24 gals. per minute (1300 lbs. solids per hour). The inner shaft 11 may be run at a speed ratio of 2:1 to 10:1 with respect to the outer shaft, and carrying weights of, for example 0.1 to 1 kg. and providing a shake amplitude of .01 to .1 in. Under these conditions the machine will normally be run for successive periods of from 1 to 10 hours or longer, after each of which the feed is interrupted and the sub-frame tilted to permit the accumulated tin-bearing concentrate to be hosed off and recovered.

Referring now to FIGURE 3, a sub-frame 40, generally similar to the sub-frame of FIGURES 1 and 2 and carrying trays 41 likewise, is pivotally connected on each side to a horizontal beam 42 suspended at each end by wires 43 from a fixed frame (not shown). The sub-frame 40 is constructed in two parts on either side of a central shake-shaft assembly (not shown) which is generally similar to the shake-shaft system of FIGURE 1, but rather more compact and confined within the interior of the sub-frame. In the view shown, the shake axis and the axis about which the sub-frame 40 pivots are in the same plane, but the trays 41 are displaced towards the upstream end so that the centre of gravity of the whole suspension is to the right of the pivot axis. When the trays are empty, therefore, the sub-frame 40 experiences a turning moment in the clockwise direction but is retained in the near-horizontal position by means of a stop device. The latter comprises a vertical pin 44 secured to a bracket 45 fixed to the sub-frame and passing through a hole drilled in the beam 42, and having a notch with which an adjustable spring-loaded ball catch 46 normally engages. The ball catch 46 is fixed to the beam 42.

The sub-frame 40 carries a laterally projecting pin 47 at its bottom left-hand corner which engages in a slotted guide 48. The guide 48 is formed at its upper end into an extension 49 which acts as a plunger operating in a dashpot 50. The plunger 49 is connected to a head 51 provided with a non-return valve 52 and operating against a spring 53. The dashpot 50 has a by-pass 54 for hydraulic fluid.

Connected to the upper end of the guide 48 is a pivoted catch 55 operated by a lever 56 which is fixed at its other end to the dashpot 50. The guide 48 is so mounted as to be capable of longitudinal movement and also rotational movement as hereinafter described. Feed pipes and wash-off arrangements have not been illustrated but will of course be provided as before.

The device operates as follows. The sub-frame 40 and trays 41 initially assume the position illustrated, and slime is fed to the upper ends of the trays which are subjected to orbital shaking motion as in the FIGURE 1 embodiment. After a period the banked tin concentrate forms and is found to accumulate towards the lower ends of the trays. When the weight of banked material exceeds a certain value the anti-clockwise turning movement is sufficient to disengage the pin 44 from the ball catch 46 and cause the sub-frame 40 to pivot about the beam 42. This causes the projecting pin 47 to ride up the guide 48 which accordingly moves to permit the pin 47 to follow an arcuate path. The pin 47 thus rides over the catch 55 and engages the end of the guide 48 which thereafter moves with the pin 47 causing the plunger 49 to operate in the dashpot 50. When the plunger 49 is depressed against the spring 53 hydraulic fluid flows through the valve 52. At this point the sub-frame 40 has turned through nearly 90° and the trays are almost vertical. The foregoing operations are synchronised with mechanism for interrupting slime feed and initiating a washing operation to remove banked material from the trays. For this purpose the damping of the dashpot must be adjusted so that these operations are completed before the spring 53 begins to recoil and return the plunger to its original position, hydraulic fluid flowing back to the upper end of the dashpot cylinder through the by-pass 54. The return movement of the guide 48 causes the catch 55 to pivot releasing the pin 47 to ride down the slot in response to the clockwise bias of the sub-frame 40. The pin 42 eventually re-engages with the ball catch 46, and the apparatus is restored to the position illustrated to enable the next slime feed cycle to commence.

In an alternative to the FIGURE 3 embodiment all the mechanisms may be mounted on the support frame and the beam(s) may be replaced by single pivots centrally placed on either side of the sub-frame and hung from two suspension wires.

Referring now to FIGURE 4 the apparatus comprises a stack of plastic sheet 60 five feet in length and of thickness one-twentieth of an inch mounted on rods 61 disposed at intervals of approximately one foot along the opposite longer sides thereof and one additional rod 61 positioned at the mid-point of each of the shorter sides of the sheets. The sheets are spaced apart at a distance of half-inch by spacers 62. The stack is supported in a framework 63 comprising upper and lower tubular members 64 connected to vertical I sections 65 to the outer webs of which are connected rods 66. The I sections are braced by horizontal strips 66a. (FIGURE 6). The stack is suspended in the frame 63 by means of wires 67 (one per sheet) which thread alternately around the rods 61 and the rods 66, and are connected to tensioning capstans 68 secured to the frame 63. Initially the sheets 60 have a pronounced bow towards the centre, but after the wires 67 have been tensioned the sheets 60 are pulled outwardly and become quite straight leaving a uniform spacing across their width. The stack and framework are assembled in the apparatus shown in FIGURE 6 as described more fully hereinafter.

Referring now to FIGURE 5, a stack of plastic sheets 70 is formed with tubes 71 passing through the stack in place of the rods in FIGURE 4. The sheets 70 are spaced by means of washers 72. The upper and lower ends of each tube 71 fit into an annular groove formed in plates 73 and the tube 71 are stiffened by means of a tie rod 74 applying compression to the tubes through the plates 73. The plates 73 are formed with an extension bolted to the sub-frame 75. The plates 73 are swelled out on their other ends to form extensions 77 which abut against tubes 78 which are arranged to be expanded outwardly from the centre by means of left and right handed jacking screws 79. In this device an external tensioning frame is avoided.

FIGURE 6 shows the framework 63 complete with sheets 60 suspended from a fixed frame 80 on each side by means of wires 81 connected to pivots 82 attached to plates 83 secured to the framework 63 by the members 84. The framework is hung so that the sheets 60 slope downwardly from the right hand end.

The tensioning capstans 68 of FIGURE 4 are welded to each corner of the framework 63.

The orbital movement is supplied by means of two stub shafts 85 mounted in bearings connected to upper and lower tubular members 64. The shafts 85 are provided with out-of-balance weights 86 and are rotated at the same speed by suitable belt gearing connected to an electric motor mounted at the right hand end of the framework 63. For convenience of illustration the motor and belt gearing and associated lay shafts are not shown in full. The stub shafts 85 are positioned centrally with respect to the framework 63 as seen in plan view.

The suspension to be processed is fed to the stack through a flexible pipe 87 connected to a manifold 88 from which four vertical pipes 89 extend. Small tubes 90 are welded into the pipes 89 and supply the suspension to each sheet in the stack.

The tipping mechanism of the apparatus comprises a piston 91 operated through a pneumatic system and electrical timing device indicated schematically at 92 and 93 respectively. A box for receiving tailings and concentrate during the washing operation is indicated at 94.

I claim:
1. Apparatus suitable for the treatment of ores or other solid materials containing fractions of different density and/or particle size comprising a movable frame, a stack of sheets spaced one above the other and carried by said frame, each sheet of the stack providing a surface to which a liquid suspension of the material may be fed, and being capable of assuming when in operation a gentle inclination to the horizontal, means for imparting an orbital shaking motion to the frame about an axis interiorly located within said stack of sheets and applying to each surface an orbital motion uniform throughout said surface and substantially in the plane of the surface and means for varying the amplitude and/or frequency of the orbital motion to achieve conditions of shear in the suspension such that, when applied to the surface, it flows on the surface towards the lower edge thereof with the lighter fractions and/or finer particles remaining suspended in the upper portion of the layer of material and gradually advancing towards the edge of the surface, whilst banking of the heavier fractions and/or coarser particles occurs on the surface.

2. Apparatus according to claim 1, in which each surface is disposed at a slope of the order of 1°.

3. Apparatus according to claim 1, in which the means for applying the orbital motion is an out-of-balance shaft mounted for rotation on the movable frame.

4. Apparatus according to claim 1, comprising also means for superimposing an additional orbital motion of relatively higher frequency and smaller amplitude.

5. Apparatus according to claim 1, comprising means for tilting of the movable frame to permit removal of material accumulated on the surfaces.

6. Apparatus according to claim 5, comprising timing means for actuating the tilting means.

7. Apparatus according to claim 6 in which the timing means is operated in response to the weight of banked material on the surfaces.

8. Apparatus according to claim 1, comprising a stack of sheets closely spaced one above the other and subjected to lateral tension.

9. Apparatus according to claim 8, in which tension is applied by means of tensioning wires acting on rods or tubes passing through the stack.

10. Apparatus for performing a density separation or particle size separation of solid material suspended in a liquid, comprising a stack of thin and flexible sheets of plastics or other material mounted one above another in spaced relationship and providing surfaces on which the suspension is to be separated during flow thereon, said sheets being mounted in a movable frame and in lateral tension with respect to the direction of flow, means for feeding the suspension to the surface of each sheet, a fixed frame on which the movable frame is carried in such a manner that the inclination of the sheets to the horizontal may be adjusted, drive means for moving the movable frame about an axis interiorly located within said stack of sheets whereby each sheet performs an orbital motion uniform throughout said surface and substantially in the plane thereof and means for varying and adjusting the amplitude and/or frequency of said orbital motion to a value at which the lighter fractions and/or finer particles are advanced on the surface whilst the heavier fractions and/or coarser particles are retained thereon and accumulate layer upon layer.

11. Apparatus according to claim 10, in which the drive means comprise out-of-balance shafts mounted for rotation in synchronism and substantially coaxially on the top and bottom of the movable frame.

References Cited

UNITED STATES PATENTS

| 685,773 | 11/1901 | Lewis | 209—437 |
|---------|---------|-------|---------|
| 801,289 | 10/1905 | Wiswell | 209—437 |
| 804,466 | 11/1905 | Hamilton | 209—437 |
| 1,007,074 | 10/1911 | Deister | 209—491 |
| 1,007,075 | 10/1911 | Deister | 209—437 X |
| 1,010,350 | 11/1911 | Deister | 209—491 X |
| 1,105,109 | 7/1914 | Stenger | 209—491 |
| 1,541,246 | 6/1925 | Boylan | 209—491 |
| 1,579,993 | 4/1926 | Andre | 209—504 |
| 2,832,472 | 4/1958 | Pierce | 209—442 |

FOREIGN PATENTS 303,233  1/1929  Great Britain.

TIM R. MILES, Primary Examiner

U.S. Cl. X.R.

209—491, 504